United States Patent
Yoshida et al.

(10) Patent No.: US 12,141,173 B2
(45) Date of Patent: Nov. 12, 2024

(54) ERROR FACTOR ESTIMATION DEVICE AND ERROR FACTOR ESTIMATION METHOD

(71) Applicant: Hitachi High-Tech Corporation, Tokyo (JP)

(72) Inventors: Yasuhiro Yoshida, Tokyo (JP); Masayoshi Ishikawa, Tokyo (JP); Fumihiro Sasajima, Tokyo (JP); Masami Takano, Tokyo (JP); Koichi Hayakawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 18/024,930

(22) PCT Filed: Sep. 17, 2020

(86) PCT No.: PCT/JP2020/035274
§ 371 (c)(1),
(2) Date: Mar. 6, 2023

(87) PCT Pub. No.: WO2022/059135
PCT Pub. Date: Mar. 24, 2022

(65) Prior Publication Data
US 2023/0325413 A1    Oct. 12, 2023

(51) Int. Cl.
*G06F 16/00* (2019.01)
*G06F 16/22* (2019.01)
*G06F 16/28* (2019.01)

(52) U.S. Cl.
CPC ........ *G06F 16/285* (2019.01); *G06F 16/2246* (2019.01)

(58) Field of Classification Search
None
See application file for complete search history.

(56) References Cited

U.S. PATENT DOCUMENTS

| 10,699,926 B2 | 6/2020 | Plihal et al. |
| 2007/0022063 A1 | 1/2007 | Lightowler |

(Continued)

FOREIGN PATENT DOCUMENTS

| JP | 2020-35282 A | 3/2020 |
| TW | I774708 B | 8/2022 |

OTHER PUBLICATIONS

International Search Report (PCT/ISA/210) issued in PCT Application No. PCT/JP2020/035274 dated Nov. 2, 2020 with English translation (five (5) pages).

(Continued)

*Primary Examiner* — Anhtai V Tran
(74) *Attorney, Agent, or Firm* — Crowell & Moring LLP

(57) ABSTRACT

An error cause estimation device comprising: a data pre-processing unit that uses data to be processed and generates training data that has an appropriate format for input to a machine learning model; and a model tree generation unit that generates error detection models that are training models for detecting errors and uses the training data as inputs therefor, and generates a model tree that expresses the relationship between error detection models by using a tree structure that has the error detection models as node therefor. Thus, it is possible to generate a training model that detects errors for each of a plurality of types of errors that occur, even when there has been no prior annotation of error causes.

10 Claims, 9 Drawing Sheets

(56) References Cited

U.S. PATENT DOCUMENTS

| | | | |
|---|---|---|---|
| 2018/0149603 A1 | 5/2018 | Bhattacharyya et al. | |
| 2019/0286096 A1* | 9/2019 | Kawanoue | G05B 23/0254 |
| 2020/0004921 A1 | 1/2020 | Baidya et al. | |
| 2020/0074611 A1 | 3/2020 | Dou et al. | |
| 2020/0226742 A1 | 7/2020 | Sawlani et al. | |
| 2020/0234428 A1 | 7/2020 | George et al. | |
| 2021/0319098 A1* | 10/2021 | Pogorelik | G06F 21/554 |
| 2023/0122653 A1* | 4/2023 | Yoshida | G06F 11/0706 714/37 |
| 2023/0402249 A1* | 12/2023 | Yoshida | H01J 37/28 |

OTHER PUBLICATIONS

Japanese-language Written Opinion (PCT/ISA/237) issued in PCT Application No. PCT/JP2020/035274 dated Nov. 2, 2020 (six (6) pages).

Chinese-language Office Action issued in Taiwanese Application No. 110130606 dated Nov. 16, 2022 with partial English translation (seven (7) pages).

Hayashi et al., "Model Reduction of Neural Network Trees Based on Dimensionality Reduction," In: Proceedings of International Joint Conference on Neural Networks, Jun. 19, 2009, pp. 1171-1176 (eight (8) pages).

Hayashi et al. "A Fast Algorithm for Inducing Neural Network Trees," In: IPSJ Journal, [CD-ROM], Aug. 15, 2008, pp. 2878-2889, vol. 49, No. 8 with English abstract (17 pages).

Seto et al., "IoT technology and applications for engineers," First Edition, Tokyo: Japan Industrial Publishing Co., Ltd., Jul. 25, 2016, pp. 68-83 with partial English translation (25 pages).

\* cited by examiner

[FIG. 1]
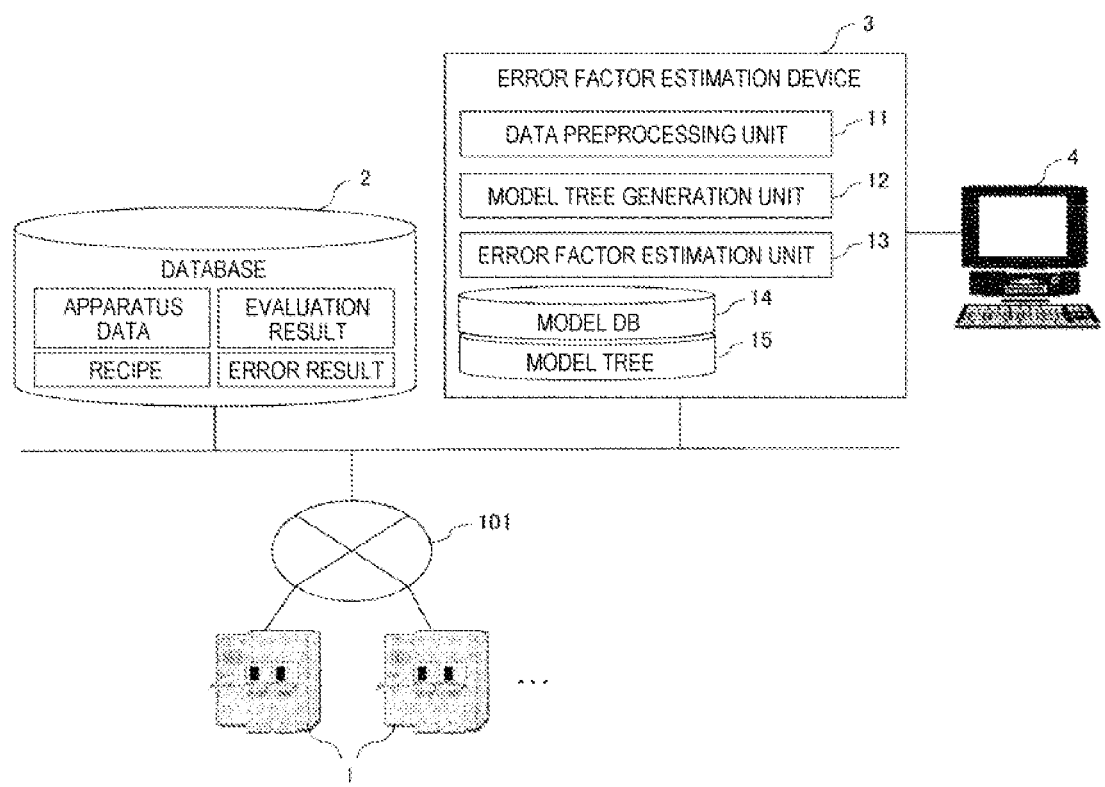

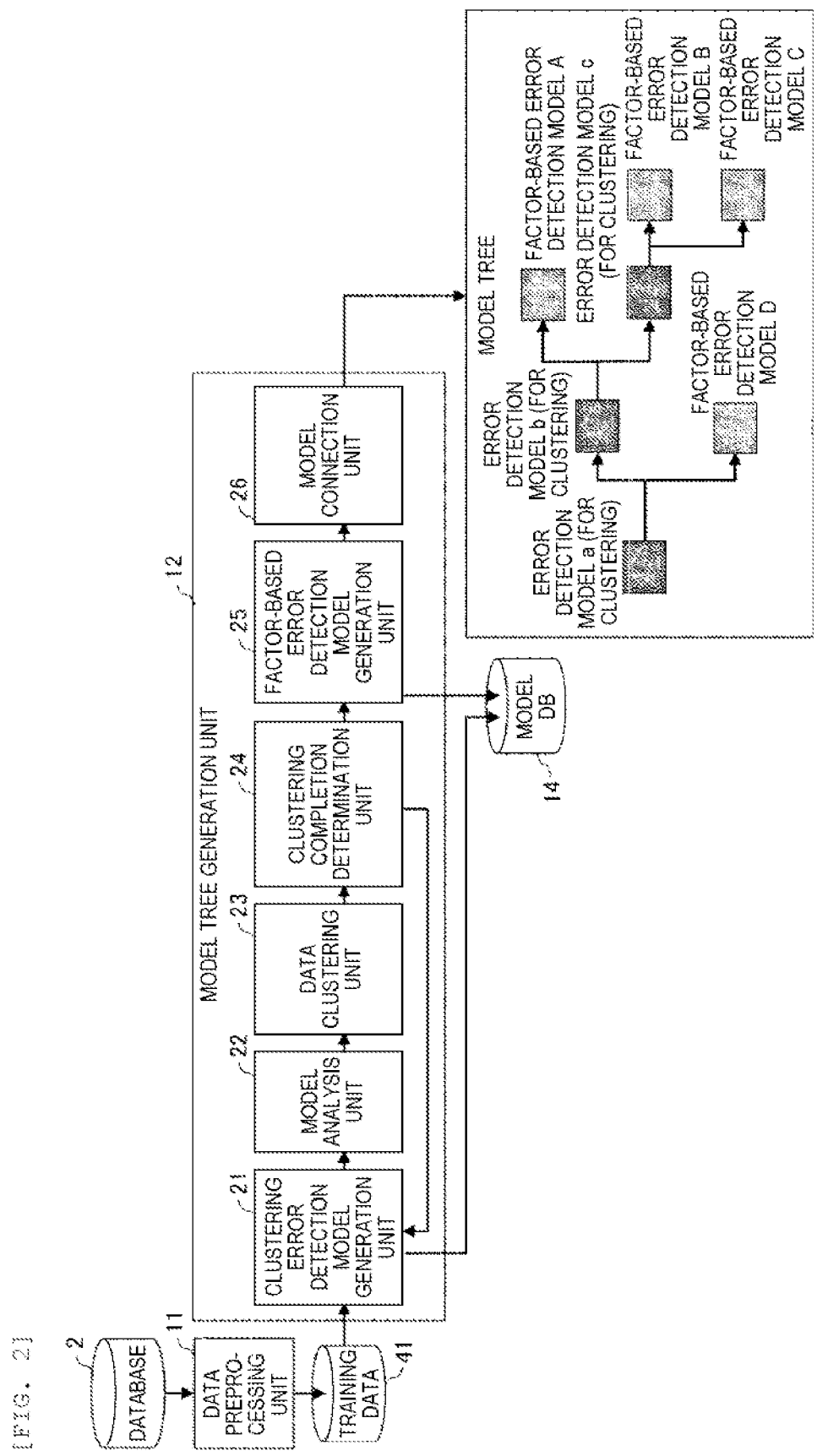

[FIG. 3]
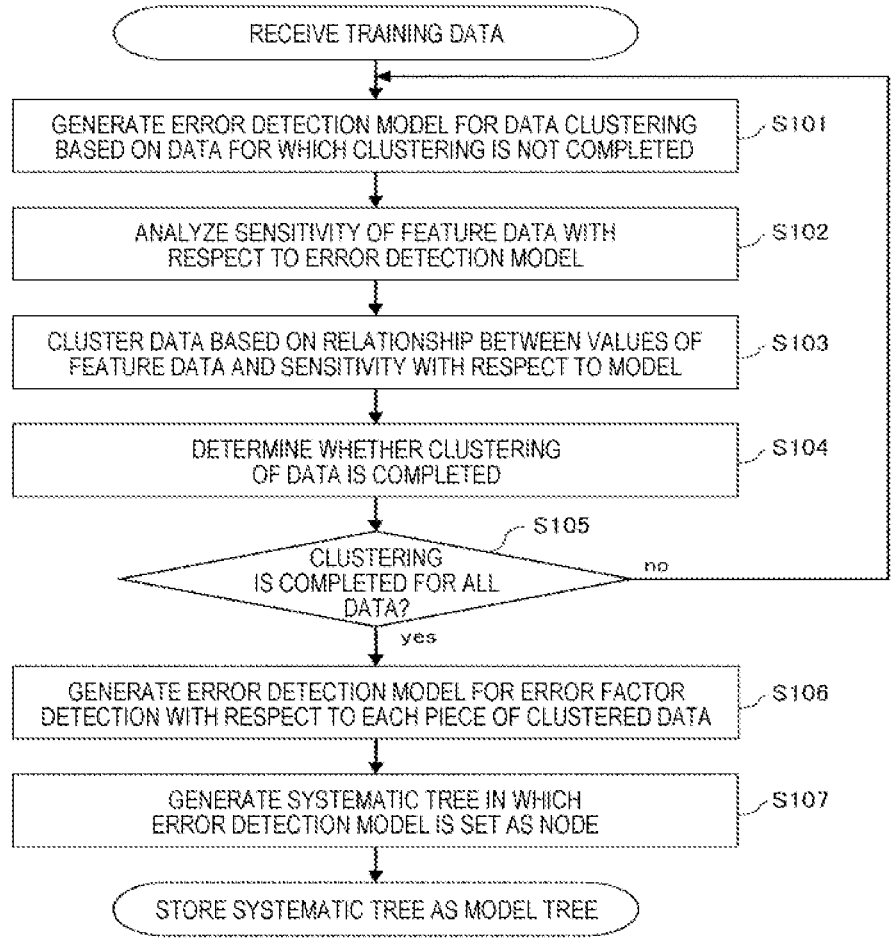

[FIG. 4]
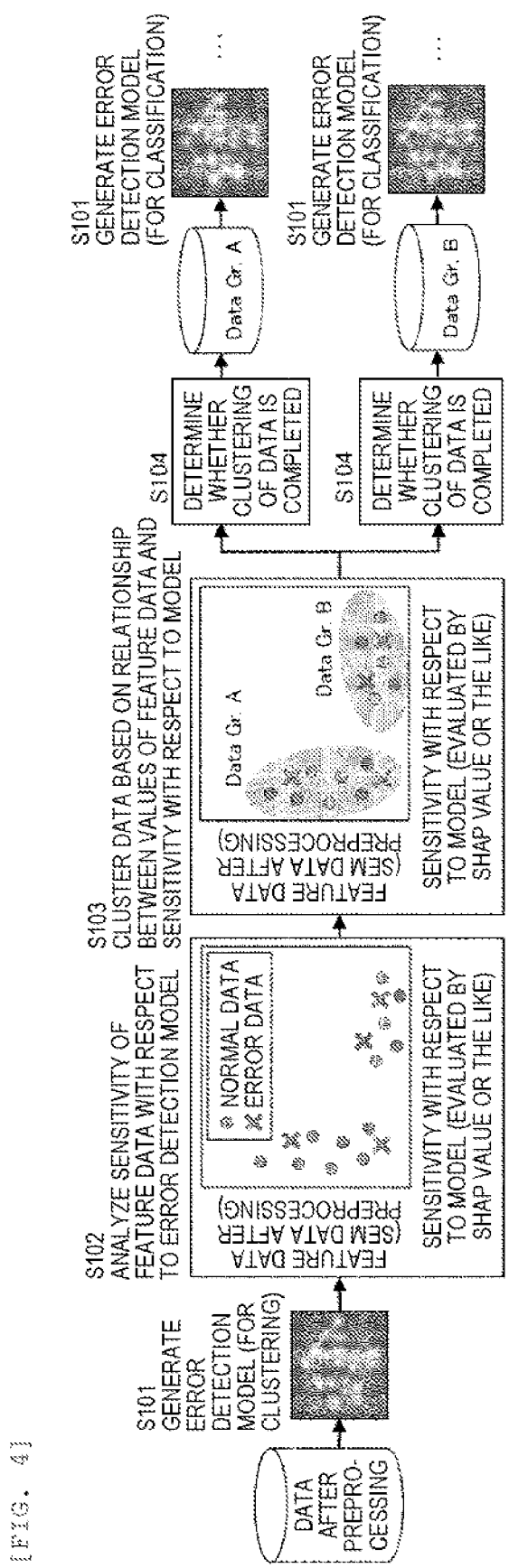

[FIG. 5]
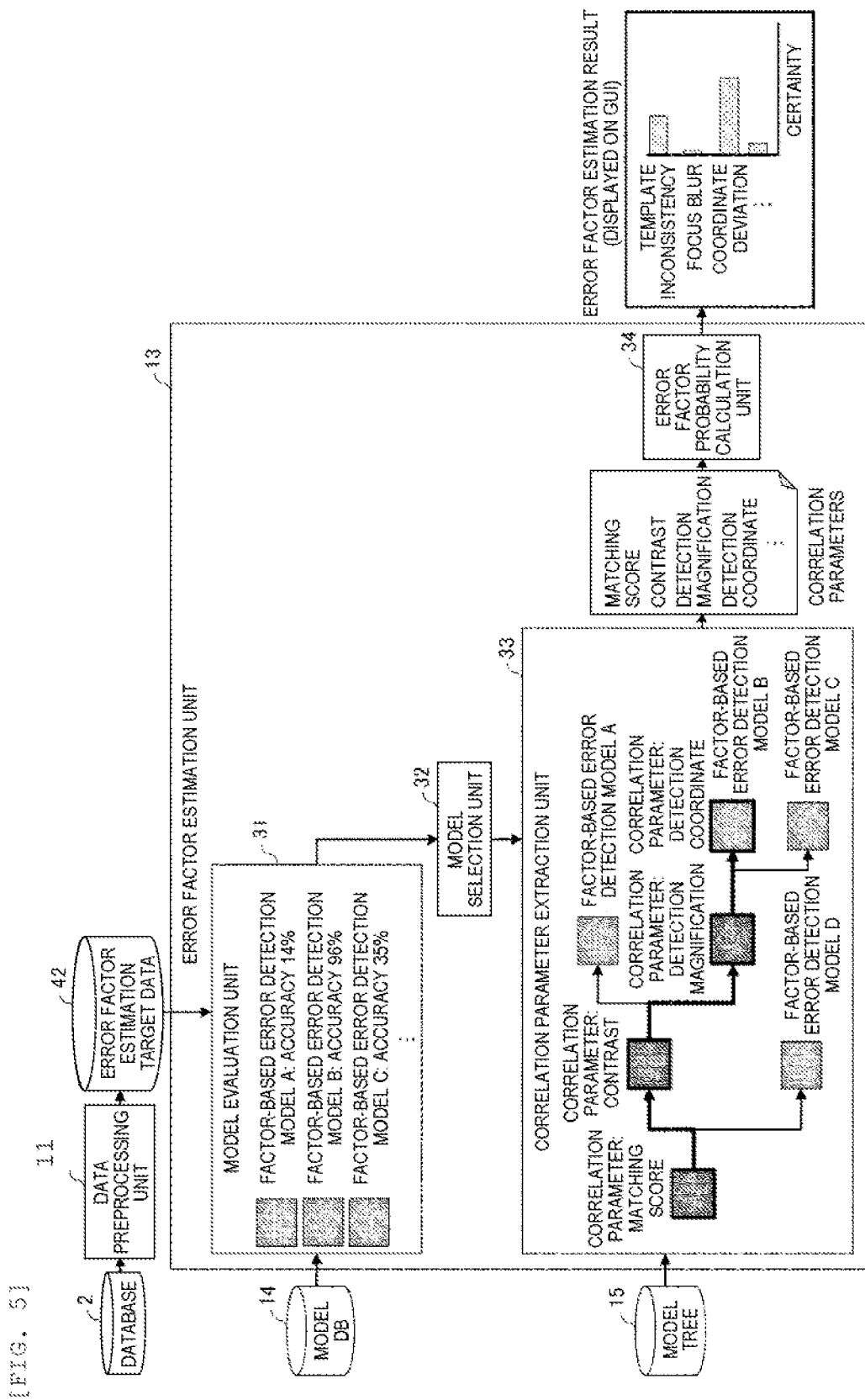

[FIG. 6]
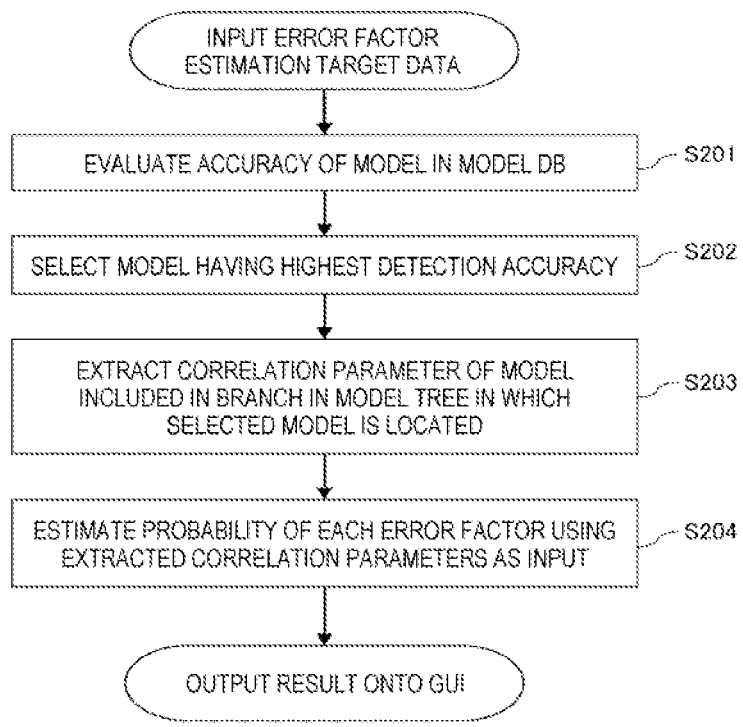

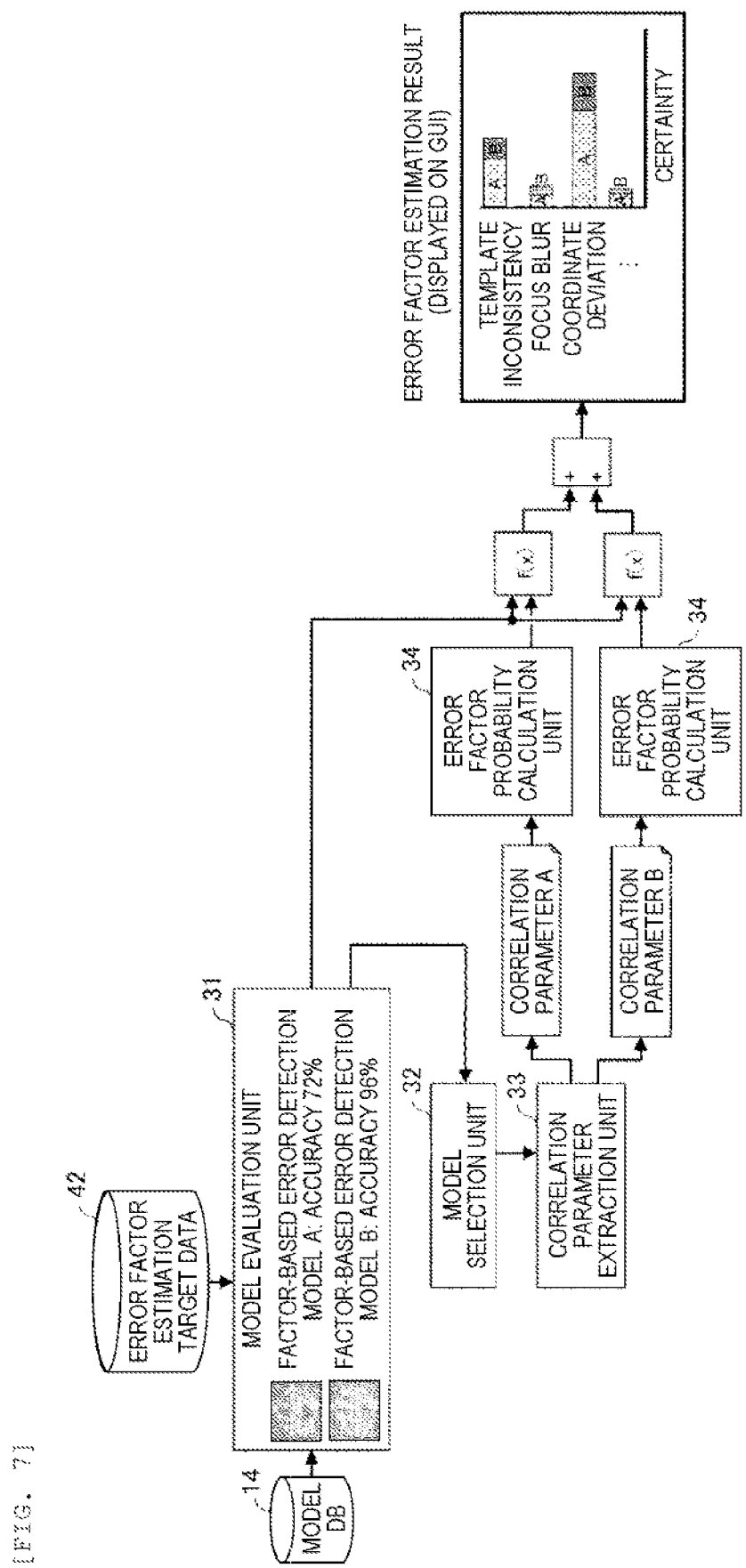

[FIG. 8]
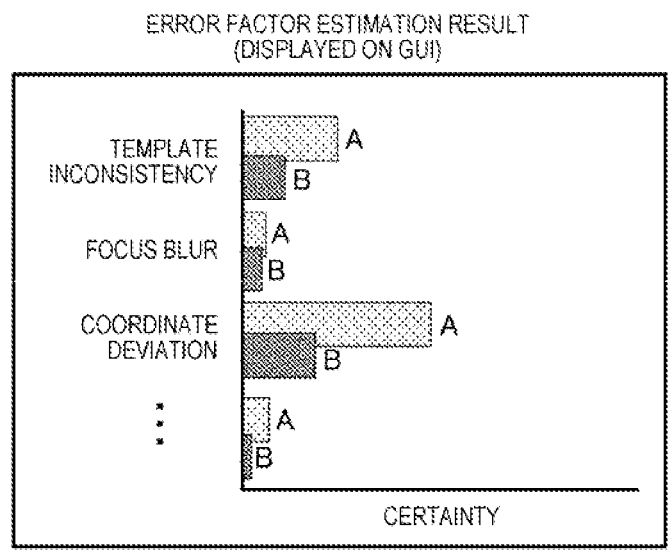
[FIG. 9]
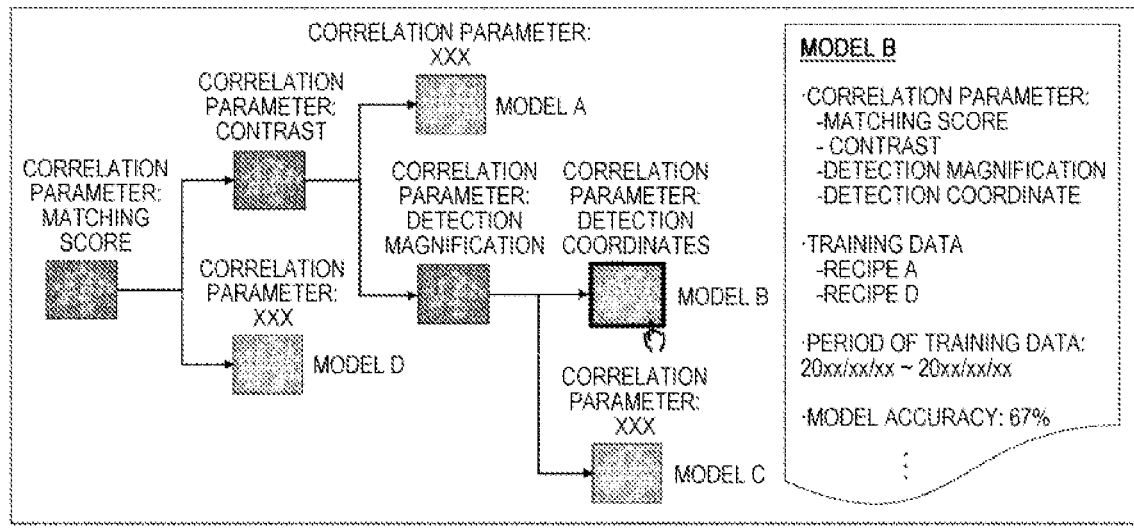

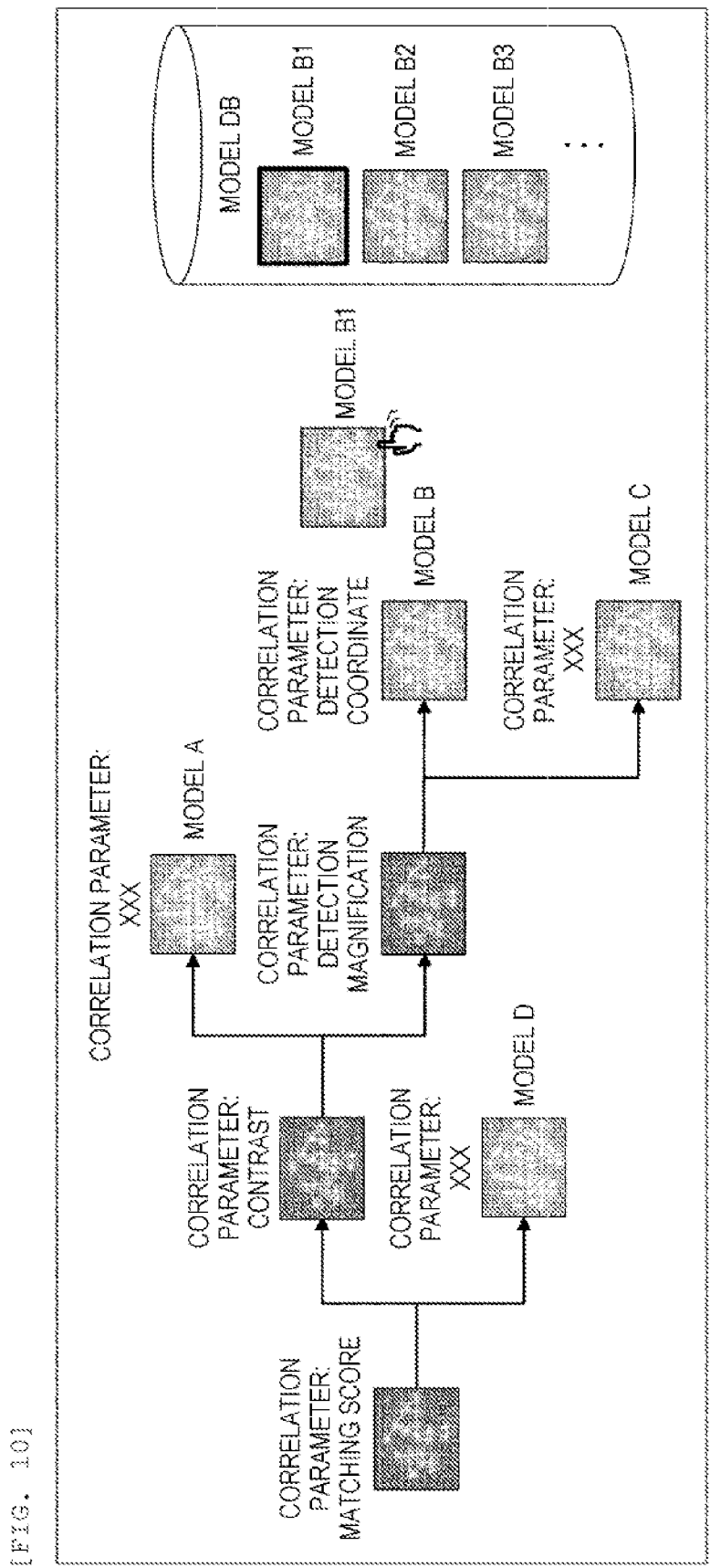

ERROR FACTOR ESTIMATION DEVICE AND ERROR FACTOR ESTIMATION METHOD

TECHNICAL FIELD

The present invention relates to an error factor estimation device and an error factor estimation method.

BACKGROUND ART

A semiconductor evaluation apparatus and a semiconductor inspection apparatus inspect and evaluate each inspection point on a surface of a semiconductor wafer according to setting parameters called a recipe. In general, a recipe parameter is adjusted by an engineer optimizing each item by manual work according to a property of a target to be evaluated and inspected, characteristics of an apparatus, or the like. Therefore, for example, when the characteristics of the apparatus are changed due to use of a recipe with insufficient adjustment or a temporal change, an error may occur in an inspection operation or an evaluation operation. Such an error is called a recipe error as an error caused by contents of the recipe.

In general, when a recipe error occurs, a service engineer analyzes internal data of the apparatus from the semiconductor evaluation apparatus or the semiconductor inspection apparatus and specifies a location of a cause. However, with miniaturization and diversification of semiconductors, the number of recipes increases and recipe setting items increase, and recipe creation becomes complicated. Therefore, it takes time to specify a cause of a recipe error, which is a cause of lowering an operation rate of the apparatus.

PTL 1 discloses a pattern inspection system that inspects an image of an inspection target pattern using a classifier implemented by machine learning based on an image of the inspection target pattern of an electronic device and data used for manufacturing the inspection target pattern, in order to save time and effort on a true value creation operation of training data and reduce an amount of the training data to enable shortening of a training time. In the pattern inspection system, an image selection unit (training data selection unit) selects a training pattern image used in machine learning from a plurality of pattern images based on pattern data and the pattern images stored in a storage unit, and clusters data having a plurality of position coordinates, in which the same shape pattern stored for each pattern is present, so as to divide the data into one or more classes.

CITATION LIST

Patent Literature

PTL 1: JP2020-35282A

SUMMARY OF INVENTION

Technical Problem

The training data selection unit of the pattern inspection system described in PTL 1 clusters the data having the plurality of position coordinates based on the same shape pattern. However, the training data selection unit is not based on a degree of contribution of each parameter to an error, and it is considered that there is room for improvement.

An object of the invention is to generate a training model that detects an error for each of various types of errors that occur even without labeling of an error factor in advance. Another object of the invention is to reduce the number of labeling processes.

Solution to Problem

An error factor estimation device according to the invention includes: a data preprocessing unit configured to generate training data having a format suitable for input into a machine learning model using data to be processed; and a model tree generation unit configured to generate an error detection model, which is a training model configured to detect an error using the training data as input, and generate a model tree that represents a relationship between error detection models with a tree structure in which the error detection model is set as a node.

Advantageous Effects of Invention

According to the invention, it is possible to generate a training model that detects an error for each of various types of errors that occur even without labeling of an error factor in advance. Further, according to the invention, the number of labeling processes can be reduced.

BRIEF DESCRIPTION OF DRAWINGS

FIG. 1 is a configuration diagram illustrating an example of an information processing system including an error factor estimation device according to an embodiment.

FIG. 2 is a configuration diagram illustrating a model tree generation unit in FIG. 1.

FIG. 3 is a flowchart illustrating steps in the model tree generation unit in FIG. 2.

FIG. 4 is a schematic diagram illustrating steps of clustering error data and generating an error detection model in the model tree generation unit, which is a part of the steps in FIG. 3.

FIG. 5 is a configuration diagram illustrating an error factor estimation unit in FIG. 1.

FIG. 6 is a flowchart illustrating steps of calculating an error factor probability in the error factor estimation unit.

FIG. 7 is a schematic diagram illustrating a configuration in which error factor probabilities obtained by analyzing a plurality of error detection models are combined and visualized.

FIG. 8 is a terminal screen illustrating an example of the error factor probabilities obtained by analyzing the plurality of error detection models.

FIG. 9 is a terminal screen illustrating an example of information on the error detection model in the model tree.

FIG. 10 is a terminal screen illustrating an example of an operation of replacing the error detection model in the model tree with another error detection model.

DESCRIPTION OF EMBODIMENTS

An error factor estimation device and an error factor estimation method according to an embodiment of the invention will be collectively described.

The error factor estimation device includes a data preprocessing unit and a model tree generation unit.

Preferably, the model tree generation unit includes: a clustering error detection model generation unit configured to learn an error detection rule based on a difference in tendency between normal data and error data and generate an error detection model for clustering, using data for which clustering is not completed among training data as input; a model analysis unit configured to calculate a value of sensitivity indicating a degree of contribution of feature data input as the training data to output of an error detection model; a data clustering unit configured to cluster data based on the feature data and the value of sensitivity; a clustering completion determination unit configured to determine whether clustering is completed for the clustered data; a factor-based error detection model generation unit configured to learn the error detection rule based on the difference in tendency between the normal data and the error data and generate a factor-based error detection model, using the data for which clustering is completed as the input; and a model connection unit configured to generate, by connecting the error detection model for clustering and the factor-based error detection model based on a flow of clustering of data, a model tree which is a phylogenetic tree in which the error detection model for clustering and the factor-based error detection model are set as nodes.

Preferably, the error detection model for clustering has a simpler model structure than the factor-based error detection model.

Preferably, the error factor estimation device further includes an error factor estimation unit. The error factor estimation unit includes: a model evaluation unit configured to evaluate performance of the generated factor-based error detection model (factor-based error detection model generated and accumulated in advance) using, as input, error factor estimation target data generated as data having a format suitable for the input into the machine learning model by using the data preprocessing unit for data for which an error factor is estimated among the data to be processed; a model selection unit configured to select one or more factor-based error detection models in which a performance evaluation value is determined to be large by the model evaluation unit; and a correlation parameter extraction unit configured to extract a branch in the model tree in which the selected factor-based error detection model is located and extract a correlation parameter of the error detection model included in the branch.

Preferably, the error factor estimation unit further includes an error factor probability calculation unit configured to calculate a probability of an error factor candidate using the correlation parameter extracted by the correlation parameter extraction unit as input.

Preferably, in the error factor estimation device, when a plurality of factor-based error detection models are selected by the model selection unit, the probability obtained based on each of the factor-based error detection models is corrected using a model evaluation value obtained by the model evaluation unit.

Preferably, the error factor estimation device further includes a model database configured to store, in association with each other, the error detection model for clustering, the factor-based error detection model, and information on these models.

Preferably, in the error factor estimation device, when there are a plurality of versions in the error detection model for clustering and the factor-based error detection model stored in the model database, a user can replace the model in the model tree with another model stored in the model database using a terminal.

Preferably, the data to be processed is at least one of a setting parameter and an evaluation result of an object.

Preferably, in the error factor estimation device, the probability before and after the correction is displayed on a terminal.

Preferably, in the error factor estimation device, the information associated with the selected error detection model is displayed by a user selecting the error detection model included in the model tree via a terminal.

An error factor estimation method includes: a data preprocessing step of generating training data having a format suitable for input into a machine learning model by using data to be processed; and a model tree generation step of generating an error detection model, which is a training model that detects an error by using the training data as input, and generating a model tree that represents a relationship between error detection models by a tree structure in which the error detection model is set as a node.

Preferably, the model tree generation step includes: a clustering error detection model generation step of generating an error detection model for clustering by learning an error detection rule based on a difference in tendency between normal data and error data, using data for which clustering is not completed among training data as input; a model analysis step of calculating a value of sensitivity indicating a degree of contribution of feature data input as the training data to output of an error detection model; a data clustering step of clustering data based on the feature data and the value of sensitivity; a clustering completion determination step of determining whether clustering is completed for the clustered data; a factor-based error detection model generation step of generating a factor-based error detection model by learning the error detection rule based on the difference in tendency between the normal data and the error data, using the data for which clustering is completed as input; and a model connection step of generating a model tree which is a phylogenetic tree in which the error detection model for clustering and the factor-based error detection model are set as nodes, by connecting the error detection model for clustering and the factor-based error detection model based on a flow of clustering of data.

In the embodiment described below, a "semiconductor inspection apparatus" includes a device that evaluates a dimension of a pattern formed on a surface of a semiconductor wafer, a device that inspects presence or absence of a defect in a pattern formed on the surface of the semiconductor wafer, or a device that inspects presence or absence of a defect in a bare wafer on which a pattern is not formed, and the like, and also includes a composite device implemented by combining a plurality of these devices.

In the embodiment described below, "inspect" is used in a meaning of evaluation or inspection, "inspection operation" is used in a meaning of evaluation operation or inspection operation, and "target to be inspected" indicates a wafer to be evaluated or inspected or a region to be evaluated or inspected in the wafer.

EMBODIMENT

FIG. 1 illustrates an example of an information processing system including an error factor estimation device according to an embodiment.

In FIG. 1, a semiconductor inspection apparatus 1 is connected to a database 2 and an error factor estimation device 3 (device for estimating an error factor) via a network 101. The error factor estimation device 3 is connected to a terminal 4. The error factor estimation device 3 estimates a factor of an error in an inspection operation performed by the semiconductor inspection apparatus 1.

Data transmitted from the semiconductor inspection apparatus 1 includes, for example, apparatus data, an evaluation recipe (hereinafter, may be simply referred to as "recipe"), an evaluation result, and an error result. The recipe may include the number of evaluation points (EP) and coordinate information on the evaluation points, an imaging condition when an image is captured, an imaging sequence, and the like. In addition, the recipe may include coordinates, an imaging condition, and the like of an image acquired in a preparation stage for evaluating the evaluation point together with the evaluation point.

The apparatus data includes an apparatus-specific parameter, apparatus difference correction data, and an observation condition parameter. The apparatus-specific parameter is a correction parameter used to operate the semiconductor inspection apparatus 1 according to a specified specification. The apparatus difference correction data is a parameter used to correct a difference between semiconductor inspection apparatuses. The observation condition parameter is, for example, a parameter that defines an observation condition of a scanning electron microscope (SEM), such as an acceleration voltage of an electron optical system.

The recipe includes a wafer map, an alignment parameter, an addressing parameter, and a length measurement parameter as recipe parameters. The wafer map is a coordinate map (for example, coordinates of a pattern) of the surface of the semiconductor wafer. The alignment parameter is, for example, a parameter used to correct a deviation between a coordinate system of the surface of the semiconductor wafer and a coordinate system inside the semiconductor inspection apparatus 1. The addressing parameter is, for example, information for specifying a characteristic pattern present in a region to be inspected among patterns formed on the surface of the semiconductor wafer. The length measurement parameter is a parameter that describes a condition for measuring a length, and is, for example, a parameter that specifies the length of which part of the pattern is to be measured.

An evaluation result includes a length measurement result, image data, and an operation log. The length measurement result describes a result obtained by measuring the length of the pattern on the surface of the semiconductor wafer. The image data is an observation image of the semiconductor wafer. The operation log is data describing an internal state of the semiconductor inspection apparatus 1 in each operation step of alignment, addressing, and length measurement. Examples of the operation log include an operating voltage of each component, and coordinates of an observation field of view.

The error result is a parameter that indicates the error occurs in which operation step of alignment, addressing, and length measurement when the error occurs.

The data such as the apparatus data, the recipe, the evaluation result, and the error result is accumulated in the database 2 via the network 101. The accumulated data is analyzed by the error factor estimation device 3. An analysis result is displayed in a format that can be read by the user on the terminal 4 (GUI).

The error factor estimation device 3 includes a data preprocessing unit 11, a model tree generation unit 12, an error factor estimation unit 13, a model database 14 (model DB), and a model tree 15.

The data preprocessing unit 11 shapes raw data (data to be processed) such as the apparatus data, the recipe, and the evaluation result transmitted from the database 2 into data having a format suitable for the machine learning model, and outputs the data as training data. Here, the shaping of data includes pre-processing of machine learning, such as processing of a missing value, deletion of an unnecessary variable, scaling of data, encoding of a categorical variable, and creation of composite feature data obtained by combining a plurality of pieces of data such as interaction feature data.

The model tree generation unit 12 generates a hierarchical tree structure (hereinafter, referred to as "model tree") of a training model for detecting an error, using training data as input.

FIG. 2 illustrates a configuration of the model tree generation unit 12 in FIG. 1.

The model tree generation unit 12 includes a clustering error detection model generation unit 21, a model analysis unit 22, a data clustering unit 23, a clustering completion determination unit 24, a factor-based error detection model generation unit 25, and a model connection unit 26.

The data transmitted from the database 2 is processed by the data preprocessing unit 11 and output as training data 41. The training data 41 is transmitted to the clustering error detection model generation unit 21. Then, the training data 41 is sequentially processed by the clustering error detection model generation unit 21, the model analysis unit 22, the data clustering unit 23, the clustering completion determination unit 24, the factor-based error detection model generation unit 25, and the model connection unit 26 in the model tree generation unit 12, and is output as a model tree.

In this process, the clustering completion determination unit 24 determines a clustering state, and returns the data to the clustering error detection model generation unit 21 in some cases. The clustering error detection model generation unit 21 and the factor-based error detection model generation unit 25 appropriately transmit data to the model database 14.

FIG. 3 illustrates processing steps for components in the model tree generation unit 12 in FIG. 2.

In step S101, the clustering error detection model generation unit 21 receives the training data 41 for which clustering is not completed, learns an error detection rule based on a difference in tendency between normal data and error data, and generates an error detection model for clustering. The error detection model may be generated using any machine learning algorithm, such as an algorithm based on a decision tree such as Random Forest or XGBoost, or Neural Network.

In step S102, with respect to the error detection model generated by the clustering error detection model generation unit 21, the model analysis unit 22 calculates a value of sensitivity indicating a degree of contribution of each piece of feature data in the received training data 41 to an error prediction result as model output. For example, when the error detection model is constructed by the algorithm based on the decision tree, the sensitivity can be evaluated by feature importance calculated based on the number of pieces of feature data appearing in branches in the model, an improvement value of an objective function, or the like, or a shapley additive explanations (SHAP) value for calculating a degree of contribution of a value of each piece of feature data to the model output.

In step S103, the data clustering unit 23 clusters two or more pieces of data based on a relationship between the feature data and the sensitivity with respect to the model. As a clustering method, unsupervised learning such as a k-means clustering method or a Gaussian mixture model can be used.

In step S104, the clustering completion determination unit 24 determines whether the clustering of the data clustered by the data clustering unit 23 is completed. As a method for determining whether clustering is completed, for example, the clustered data is further divided into training data and test data, and when accuracy of the error detection model generated using the training data is equal to or higher than a threshold with respect to the test data, it can be determined that the clustering is completed. A clustering completion flag is assigned to the data in which it is determined that the clustering is completed.

In step S105, it is determined whether the clustering completion flag is attached to all the data, and when there is data to which the clustering completion flag is not attached, processing from step S101 to step S104 is repeated again for the data.

FIG. 4 schematically illustrates the processing from step S101 to step S104 in FIG. 3.

In FIG. 4, data obtained in each step is clearly indicated by a graph or the like.

In S101, the error detection model for the clustering is generated. Then, in S102, the sensitivity evaluated by such as a SHAP value of each piece of feature data with respect to the error detection model is calculated. The relationship between one piece of feature data and the sensitivity thereof is a scatter diagram (graph) as illustrated in S102 in FIG. 4.

Based on the relationship between the feature data and the sensitivity, the unsupervised learning is used to cluster data into, for example, a group A (Gr. A) and a group B (Gr. B) as illustrated in FIG. 4. The processing is repeated until the clustering completion flag is assigned to all the data.

In step S106 of FIG. 3, the factor-based error detection model generation unit 25 generates an error detection model that learns an error detection rule based on a difference in tendency between normal data and error data for each piece of clustered data. Similar to the clustering error detection model generation unit 21 described above, the factor-based error detection model generation unit 25 may generate the error detection model using any machine learning algorithm, such as an algorithm based on a decision tree such as Random Forest or XGBoost, or Neural Network. However, the clustering error detection model generation unit 21 and the factor-based error detection model generation unit 25 can use different model parameter values.

A model parameter includes hyperparameters that determine complexity of a model such as the number of trees and depths of the trees in the model of the tree structure. For example, in the clustering error detection model generation unit 21, parameters such as the number of trees and the depths of the trees related to the complexity of the model can be set to values smaller than those of the model generated by the factor-based error detection model generation unit 25 so as to facilitate data analysis by the model analysis unit 22 and the clustering using an analysis result. On the other hand, in the factor-based error detection model generation unit 25, in order to improve reliability of the generated model, the model parameter values can be set after being tuned so as to improve accuracy of error detection. In summary, the error detection model for clustering has a simpler model structure than the factor-based error detection model. In FIG. 2, such a model structure is represented as a difference between the error detection model for clustering and the factor-based error detection model, that is, a difference in the number of branches.

Error detection models generated by the clustering error detection model generation unit 21 and the factor-based error detection model generation unit 25, that is, the error detection model for clustering and the factor-based error detection model are stored in the model database 14.

In step S107, the model connection unit 26 connects the models generated by the clustering error detection model generation unit 21 and the factor-based error detection model generation unit 25 based on the flow of clustering of data, thereby generating a model tree which is a phylogenetic tree in which the error detection model is set as a node. In other words, the model tree represents the relationship between the error detection models with a tree structure.

In this manner, a training model for distinguishing between normal data and error data is generated, and the model is analyzed so as to quantify the difference between the normal data and the error data. By clustering data for each error indicating a similar difference and generating a training model using the data as the same factor, it is possible to generate a training model that detects an error for each of various types of errors that occur even without labeling an error factor in advance.

Further, by visualizing a positional relationship between the models based on the model tree, it is possible to facilitate analysis and management of the models by the user, for example, which model and which model are similar to each other.

Next, a method for estimating an error factor by the error factor estimation unit 13 using the generated error detection model and the model tree thereof will be described.

FIG. 5 is a configuration diagram illustrating the error factor estimation unit 13 in FIG. 1.

The data preprocessing unit 11 shapes data for which an error factor is to be estimated among the raw data such as the apparatus data, the recipe, and the evaluation result transmitted from the database 2 into data having a format suitable for the machine learning model, and outputs the data as error factor estimation target data 42.

The error factor estimation unit 13 receives the error factor estimation target data 42 and calculates a probability of an error factor candidate. The error factor estimation unit 13 includes a model evaluation unit 31, a model selection unit 32, a correlation parameter extraction unit 33, and an error factor probability calculation unit 34.

FIG. 6 illustrates processing steps for components in the error factor estimation unit 13.

In step S201, the model evaluation unit 31 evaluates performance of the factor-based error detection model stored in the model database 14 for the error factor estimation target data 42. The performance evaluation is obtained by comparing an error prediction result, which is output of the error detection model, with a true error in the received error data. As evaluation indexes of performance, accuracy, recall, precision, F1 value, AUC, or the like can be used. Here, the F1 value is a harmonic mean of the precision and the recall. AUC is an abbreviation for area under the curve. In FIG. 5, a case in which the accuracy is used as the evaluation index of the performance is illustrated as an example.

In step S202, the model selection unit 32 selects one or more factor-based error detection models having a large performance evaluation value in the model evaluation unit 31 as models suitable for the received error data. Examples of a selection method include a method for selecting a high-order model having a high evaluation value and a method for selecting a model having an evaluation value equal to or greater than a predetermined threshold.

In step S203, the correlation parameter extraction unit 33 extracts a branch in the model tree in which the selected factor-based error detection model is located, and extracts a correlation parameter of the error detection model included in the branch. As a method for extracting the correlation parameter, it is possible to select high-order feature data having high sensitivity calculated by the model analysis unit 22 of the model tree generation unit 12. In FIG. 5, as an example, a model having the highest accuracy with respect to the received error data is "factor-based error detection model B", and thick lines indicate a branch in which the "factor-based error detection model B" is located in the model tree and a model included in the branch. For each model included in the branch, correlation parameters such as a "matching score" (matching degree between a registered pattern and a captured image), a "contrast", a "pattern detection magnification", and a "pattern detection coordinate", which are calculated as feature data when the sensitivity is high, are obtained.

In step S204, the error factor probability calculation unit 34 calculates a probability of each error factor (error factor probability) using the extracted correlation parameters as input, and presents a result, to the user, as certainty via the terminal 4. In FIG. 5, certainty of a "coordinate deviation" is the highest, and the user can determine that the error factor is highly likely to be the "coordinate deviation".

For the calculation of the error factor probability, a neural network model or the like can be used. Learning of the error factor probability model requires labeling of the error factor with respect to a combination of the correlation parameters. Since the labeling is performed in units of clustered data, the number of processing can be significantly reduced as compared with labeling for each error that occurs, which is a method in the related art.

When two or more factor-based error detection models are selected by the model selection unit 32, error factor probabilities obtained based on the correlation parameters for all the models are presented in combination.

This method will be described below.

FIG. 7 illustrates a configuration in which error factor probabilities obtained by analyzing a plurality of error detection models are combined and visualized.

For example, when two models of "factor-based error detection model A" and "factor-based error detection model B" are selected by the model selection unit 32, the correlation parameter extraction unit 33 extracts a branch in the model tree in which the models are located in the model tree, and extracts "correlation parameter A" and "correlation parameter B" respectively as correlation parameters of the error detection models included in the branch.

The "correlation parameter A" and the "correlation parameter B" are input into the error factor probability calculation unit 34, and error factor probabilities obtained based on the correlation parameters are calculated. The calculated error factor probabilities are corrected using a model evaluation value obtained by the model evaluation unit 31. In the simplest manner, each of the error factor probabilities is multiplied by model accuracy thereof and normalized. By summing up the error factor probabilities after the correction, it is possible to present, to the user, the error factor probabilities combined based on the plurality of models.

FIG. 8 illustrates an example in which error factor probabilities combined based on a plurality of models are displayed on a screen.

In this drawing, the error factor probabilities related to the correlation parameter A and the correlation parameter B are comparably graphed.

In addition, by storing the information on the models generated by the clustering error detection model generation unit 21 or the factor-based error detection model generation unit 25 in the model database 14 in association with the models, it is possible to display the information on the models selected by the user via the terminal 4.

FIG. 9 illustrates an example of this display image.

As illustrated in this drawing, the information related to the models includes, for example, highly sensitive high-order feature data (correlation parameter) calculated by the model analysis unit 22 (FIG. 2), recipe names included in the training data, a collection period of the training data, and model accuracy.

Further, when there are a plurality of versions in error detection models stored in the model database 14 in which, for example, the accumulated data in the database 2 is updated, the user can replace the model in the model tree with the model stored in the model database 14 via the terminal 4.

FIG. 10 illustrates an image of this operation.

As illustrated in this drawing, for example, by dragging a model stored in the model database 14 on the screen and dropping the model at a tree position at which the user wants to replace the model, the user can interactively update the model in the model tree.

In the present embodiment, the case of estimating the error factor of the semiconductor inspection apparatus has been described, but contents of the invention are not limited thereto, and the invention can be applied to a case of generating a model or a model tree regarding parameters defining operations of an apparatus and whether an error occurs when the parameters are adopted. That is, the contents of the invention can be applied to apparatuses other than the semiconductor inspection apparatus.

REFERENCE SIGNS LIST

1: semiconductor inspection apparatus
2: database
3: error factor estimation device
4: terminal
11: data preprocessing unit
12: model tree generation unit
13: error factor estimation unit
14: model database
15: model tree
21: clustering error detection model generation unit
22: model analysis unit
23: data clustering unit
24: clustering completion determination unit
25: factor-based error detection model generation unit
26: model connection unit
31: model evaluation unit
32: model selection unit
33: correlation parameter extraction unit
34: error factor probability calculation unit
41: training data
42: error factor estimation target data

The invention claimed is:
1. An error factor estimation method comprising:
a data preprocessing step of generating training data having a format suitable for input into a machine learning model using data to be processed; and
a model tree generation step of generating an error detection model, which is a training model configured to detect an error using the training data as input, and generating a model tree that represents a relationship between error detection models with a tree structure in which the error detection model is set as a node;

wherein the model tree generation step includes:
- a clustering error detection model generation step of learning an error detection rule based on a difference in tendency between normal data and error data and generating an error detection model for clustering, using data for which clustering is not completed among training data as input,
- a model analysis step of calculating a value of sensitivity indicating a degree of contribution of feature data input as the training data to output of an error detection model,
- a data clustering step of clustering data based on the feature data and the value of sensitivity,
- a clustering completion determination step of determining whether clustering is completed for the clustered data,
- a factor-based error detection model generation step of learning the error detection rule based on the difference in tendency between the normal data and the error data and generating a factor-based error detection model, using the data for which clustering is completed as input, and
- a model connection step of generating, by connecting the error detection model for clustering and the factor-based error detection model based on a flow of clustering of data, a model tree which is a phylogenetic tree in which the error detection model for clustering and the factor-based error detection model are set as nodes.

2. The error factor estimation method according to claim 1, wherein
the error detection model for clustering has a simpler model structure than the factor-based error detection model.

3. The error factor estimation method according to claim 1, wherein
the data to be processed is at least one of a setting parameter and an evaluation result of an object.

4. The error factor estimation method according to claim 1, further comprising:
- a model evaluation step of evaluating performance of the generated factor-based error detection model using, as input, error factor estimation target data generated as data having a format suitable for the input into the machine learning model for data for which an error factor is estimated among the data to be processed,
- a model selection step of selecting one or more factor-based error detection models in which a performance evaluation value is determined to be large by the model evaluation step, and
- a correlation parameter extraction step of extracting a branch in the model tree in which the selected factor-based error detection model is located and extract a correlation parameter of the error detection model included in the branch.

5. The error factor estimation method according to claim 4, further comprising:
- an error factor probability calculation step of calculating a probability of an error factor candidate using the correlation parameter extracted by the correlation parameter extraction step as input.

6. The error factor estimation method according to claim 5, wherein
when a plurality of factor-based error detection models are selected by the model selection step, the probability obtained based on each of the factor-based error detection models is corrected using a model evaluation value obtained by the model evaluation step.

7. The error factor estimation method according to claim 6, further comprising:
- a model database step of storing, in association with each other, the error detection model for clustering, the factor-based error detection model, and information on these models in a model database.

8. The error factor estimation method according to claim 7, wherein
when there are a plurality of versions in the error detection model for clustering and the factor-based error detection model stored in the model database, a user can replace the model in the model tree with another model stored in the model database using a terminal.

9. The error factor estimation method according to claim 6, wherein
the probability before and after the correction is displayed on a terminal.

10. The error factor estimation method according to claim 7, wherein
the information associated with the selected error detection model is displayed by a user selecting the error detection model included in the model tree via a terminal.

* * * * *